United States Patent [19]

Krug

[11] 4,161,561
[45] Jul. 17, 1979

[54] MULTILAYER PLATE

[75] Inventor: Hans-Dietrich Krug, Heidelberg, Fed. Rep. of Germany

[73] Assignee: Firma Carl Freudenberg, Weinheim, Fed. Rep. of Germany

[21] Appl. No.: 880,824

[22] Filed: Feb. 23, 1978

[30] Foreign Application Priority Data

Mar. 5, 1977 [DE] Fed. Rep. of Germany ....... 2709644

[51] Int. Cl.² .............................................. B32B 3/26
[52] U.S. Cl. .................................. 428/213; 428/313; 428/315
[58] Field of Search ............... 428/310, 313, 315, 213, 428/215

[56] References Cited

U.S. PATENT DOCUMENTS

| | | | |
|---|---|---|---|
| 3,411,967 | 11/1968 | Rowland et al. | 428/310 |
| 3,654,012 | 4/1972 | Schlager | 156/78 |
| 3,864,201 | 2/1975 | Susuki et al. | 428/315 |
| 3,954,537 | 5/1976 | Alfter et al. | 428/315 |

Primary Examiner—William J. Van Balen
Attorney, Agent, or Firm—Sprung, Felfe, Horn, Lynch & Kramer

[57] ABSTRACT

A multilayer plate which is capable of being drawn comprises a central foam sheet of a closed cell, crosslinked polyolefin, the surfaces of which are covered with the same or different sheets of a hard material capable of being drawn.

5 Claims, 1 Drawing Figure

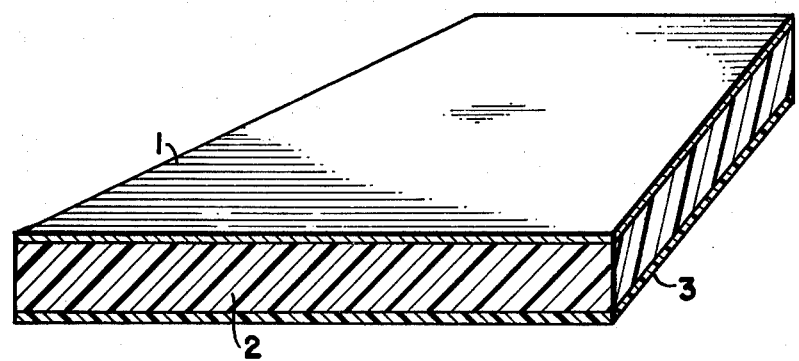

MULTILAYER PLATE

BACKGROUND OF THE INVENTION

The present invention relates to a multilayer plate which is capable of being drawn, for the fabrication of construction elements for hollow bodies.

It is known to produce hollow bodies by deformation of laminar articles. For this it is first necessary that the blank which is used consist of a material which has a high flow tendency under the deformation conditions to be applied. Thermoplastic materials and various metals are suitable for this.

To carry out the actual deformation process, the suitably selected blank is arranged over a shell mold and pressed into the mold in such a manner that it comes into the configuration of the finished workpiece by being pressed on the inside wall of the mold. A mechanical method called deep-drawing is generally used for application of the necessary force, by which a pressure stamp which is similar in its configuration to the hollow form is inserted into the hollow form for deformation of the blank. The workpieces which are obtained are extraordinarily true to form and precise in their meansurements. The method can be used very economically for massproduced articles.

More recently it has been perceived as disadvantageous to the articles obtained that it was necessary to use blanks of a compact, homogeneous structure. Particularly in the fabrication of large workpieces, an agglomeration by weight sometimes occurs which is not acceptable on statistical or other technical or economical bases. Such workpieces were often composed of different individually manufactured, deep-drawn parts and subsequently cemented or fused with each other, which of course introduces additional expenditures.

SUMMARY OF THE INVENTION

The object of the invention is to develop a multilayer plate which is capable of being drawn, for the fabrication of construction elements, especially for manufacture of hollow bodies, which plate has a relative low weight and high rigidity and mechanical strength.

The multilayer plate of the invention consists of a foam sheet of a closed cell, cross-linked polyolefin, the surfaces of which are coated with the same or different sheets of a material which is also capable of being drawn.

A closed cell, foamed, cross-linked polyethylene is particularly suitable for the structure of the foam sheet, and it is of such configuration that the surfaces of the foam sheet are coated with a band of metal and/or a sheet of a hard plastic which can be drawn. Steel or aluminum are advantageous as metal bands, or hard plastic sheets such as hard-PVC, ABS or polystyrene.

BRIEF DESCRIPTION OF THE DRAWING

The attached drawing shows an exemplary embodiment of the multilayer plate according to the invention.

DETAILED DESCRIPTION OF THE INVENTION

As shown in the figure, the multilayer plate consists of a foam sheet 2 of a closed cell, foamed, polyethylene, atop of which is a steel sheet 1 and the bottom of which is coated with a hard film 3 of PVC.

The central foam sheet can be lined with the cover layers by various methods. As long as the three flat sheets to be connected with each other exist in sheet form, it has however been advantageous to use a flame lining method, whereby an additional adhesive agent, according to the material pairing, is also often provided.

The sheet of closed cell, foamed, cross-linked polyolefin can be varied in a wide range in its density and thickness but foam sheets with a density of about 30 to 300 $kp/m^3$ with a thickness of about 1-10 mm, and preferably about 3-7 mm, are particularly suitable. With reference to the cross sectional stability in small bending radii, the diameter of the ball-shaped cells of the foam material is important. Cell diameters of 0.4-1.2 mm are preferred.

All hard materials which can be drawn are suitable as materials for the construction of the cover layers, and wide variations here are also possible. For most uses, the selection depends essentaily upon the properties which the finished article must have or on the deformation to which it is to be subjected during the fabrication.

The following examples show some uses of the novel multilayer plate for various constructions:

1. INSTRUMENT CASE

The Top consists of grained polystyrene of 1.5 mm thickness, the intermediate layer of a closed cell, foamed, cross-linked polyethylene with a density of 90 $kp/m^3$ and a thickness of 8 mm. The bottom of the foam sheet is lined inside with PVC-hard film of 0.8 mm thickness, and the film can also be lined on the service side with a decorative material or the like. The plane material is heated from both sides with infrared radiators until the cover sheets are plastically formable, and then it is drawn. Therby the sheet is pressed by means of a male mould with the shape of the inner space of the Instrument Case into a hollow mould with the shape of the outer form of the Instrument Case. As a result of the closed cell structure of the foam which is employed as intermediate layer, even in the range of big bending radii no important alterations of the wall thickness result.

2. RACING BOAT BODY

The topside (outside) consists of a 2 mm thick, ungrained and colored polystyrene layer, which is the lining of a foam sheet as in Example 1 with a density of 90 $kp/m^3$ and a thickness of 10 mm. The bottomside consists of colored hard-PVC-layer of 1.58 mm thickness. The drawing procedure corresponds to Example 1.

3. PART OF AN AUTO BODY

The top consists of a steel sheet which is capable of being cupped and is of 0.5 mm thickness, the intermediate layer of a foam sheet as in Example 1 with a density of 50 $kp/m^3$ with a 5 mm thickness, the bottom of a steel sheet which is capable of being drawn and has a 0.4 mm thickness. The material can be drawn without preheating.

The advantages obtained by use of the multilayer plate of the invention exist particularly in that it makes simple and inexpensive production of particularly large deep-drawn cupped parts possible, which have good mechanical strength and remarkable rigidity. With the same strength properties, the weight of a racing boat could for example be 75% of the weight of a conventionally manufactured analogous boat. For use in auto bodies, this multilayer plate is particularly suitable because it is extraordinarily stable against vibrations, along with a large impact absorption capacity. On this basis, auto bodies of these multilayer plates generally do not need application of anti-noise treatment.

It will be appreciated that the instant specification and examples are set forth by way of illustration and not limitation, and that various modifications and changes may be made without departing from the spirit and scope of the present invention.

What is claimed is:

1. A multilayer plate which is capable of being shaped comprising: a central foam sheet of a closed cell, cross-linked polyolefin, a sheet of metal capable of being shaped without wrinkling covering one surface of the polyolefin sheet, and a sheet of hard plastic capable of being shaped without wrinkling covering the other surface of the polyolefin sheet.

2. A multilayer plate as in claim 1, wherein the foam sheet consists of closed cell foamed cross-linked polyethylene.

3. A multilayer plate as in claim 1, wherein the metal sheets is steel or aluminum.

4. A multilayer plate as in claim 2, wherein the foam sheet has a density of about 30 to 300 kp/m$^3$ and a thickness of about 1–10 mm.

5. A multilayer plate as in claim 1, wherein the covering sheets are at least about 0.4 mm thick.

* * * * *